(12) United States Patent
Balakrishnan et al.

(10) Patent No.: US 10,284,893 B2
(45) Date of Patent: *May 7, 2019

(54) METHOD AND APPARATUS FOR MANAGING ADVERTISING

(71) Applicant: AT&T INTELLECTUAL PROPERTY I, L.P., Atlanta, GA (US)

(72) Inventors: Suhrid Balakrishnan, Scotch Plains, NJ (US); David Lee Applegate, Maplewood, NJ (US); Sumit Chopra, Jersey City, NJ (US); Simon Urbanek, Madison, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/644,915

(22) Filed: Jul. 10, 2017

(65) Prior Publication Data
US 2017/0311020 A1 Oct. 26, 2017

Related U.S. Application Data

(63) Continuation of application No. 14/805,558, filed on Jul. 22, 2015, now Pat. No. 9,736,519, which is a
(Continued)

(51) Int. Cl.
*H04H 60/32* (2008.01)
*H04N 21/2668* (2011.01)
*H04N 21/24* (2011.01)
*H04N 21/2543* (2011.01)
*H04N 21/442* (2011.01)
*H04N 21/658* (2011.01)
(Continued)

(52) U.S. Cl.
CPC ..... *H04N 21/2668* (2013.01); *G06Q 30/0244* (2013.01); *H04N 21/2407* (2013.01); *H04N 21/252* (2013.01); *H04N 21/25435* (2013.01); *H04N 21/433* (2013.01); *H04N 21/44222* (2013.01); *H04N 21/6582* (2013.01); *H04N 21/812* (2013.01)

(58) Field of Classification Search
CPC combination set(s) only.
See application file for complete search history.

(56) References Cited

U.S. PATENT DOCUMENTS 8,516,515 B2 8/2013 Zigmond et al.
2008/0263578 A1 10/2008 Bayer et al.
(Continued)

*Primary Examiner* — Mulugeta Mengesha
(74) *Attorney, Agent, or Firm* — Guntin & Gust, PLC; Andrew Gust

(57) ABSTRACT

A system that incorporates teachings of the subject disclosure may include, for example, determining identified impressions that are detected from consumption data collected from a group of media processors where the identified impressions represent viewing of selected content and where the consumption data indicates channel tuning events at the group of media processors including changing of channels, applying a ridge regression analysis to the identified impressions to determine a predicted number of target impressions per advertisement slot, and generating a media plan based on a ratio of an advertisement slot cost to the predicted number of target impressions per advertisement slot. Other embodiments are disclosed.

20 Claims, 6 Drawing Sheets

Related U.S. Application Data continuation of application No. 14/294,550, filed on Jun. 3, 2014, now Pat. No. 9,118,963, which is a continuation of application No. 13/650,470, filed on Oct. 12, 2012, now Pat. No. 8,782,683.

(51) Int. Cl.
    *H04N 21/81*     (2011.01)
    *H04N 21/25*     (2011.01)
    *G06Q 30/02*     (2012.01)
    *H04N 21/433*    (2011.01)

(56)            References Cited

U.S. PATENT DOCUMENTS

| | | |
|---|---|---|
| 2010/0049602 A1 | 2/2010 | Softky |
| 2011/0258049 A1 | 10/2011 | Ramer |
| 2011/0288907 A1* | 11/2011 | Harvey .............. G06Q 10/0639 |
| | | 705/7.29 |
| 2011/0295723 A1 | 12/2011 | Priyadarshan et al. |
| 2012/0124619 A1 | 5/2012 | Rowe et al. |
| 2012/0215640 A1 | 8/2012 | Ramer et al. |
| 2012/0253945 A1 | 10/2012 | Gao et al. |
| 2014/0278981 A1* | 9/2014 | Mersov ................. G06Q 30/02 |
| | | 705/14.53 |

* cited by examiner

100

500

METHOD AND APPARATUS FOR MANAGING ADVERTISING

CROSS-REFERENCE TO RELATED APPLICATIONS

This application is a continuation of and claims priority to U.S. patent application Ser. No. 14/805,558, filed Jul. 22, 2015, which is a is a continuation of U.S. patent application Ser. No. 14/294,550, filed Jun. 3, 2014, now U.S. Pat. No. 9,118,963, which is a continuation of U.S. patent application Ser. No. 13/650,470, filed Oct. 12, 2012, now U.S. Pat. No. 8,782,683. The contents of each of the foregoing is/are hereby incorporated by reference into this application as if set forth herein in full.

FIELD OF THE DISCLOSURE

The subject disclosure relates to communication systems and more particularly a method and apparatus for managing advertising for the systems.

BACKGROUND

The basic goal of an advertising campaign is typically to provide target customers with relevant advertisements, and television campaigns are similar in this respect. The process often begins with advertisers who research the target users for their product/service. The television ad-network (the people who create the media campaigns) then try to match the target customer group to various networks/channels or individual television programs. The goal of this process is to place ads on channels/programs where there is a high chance that the target customers will see (and hopefully act on) them. The deliverable of this process is a document called a media plan, which specifies the channels and times at which to book the ad spots (also called ad insertions) for the campaign.

BRIEF DESCRIPTION OF THE DRAWINGS

Reference will now be made to the accompanying drawings, which are not necessarily drawn to scale, and wherein.

DETAILED DESCRIPTION

Figure 1:
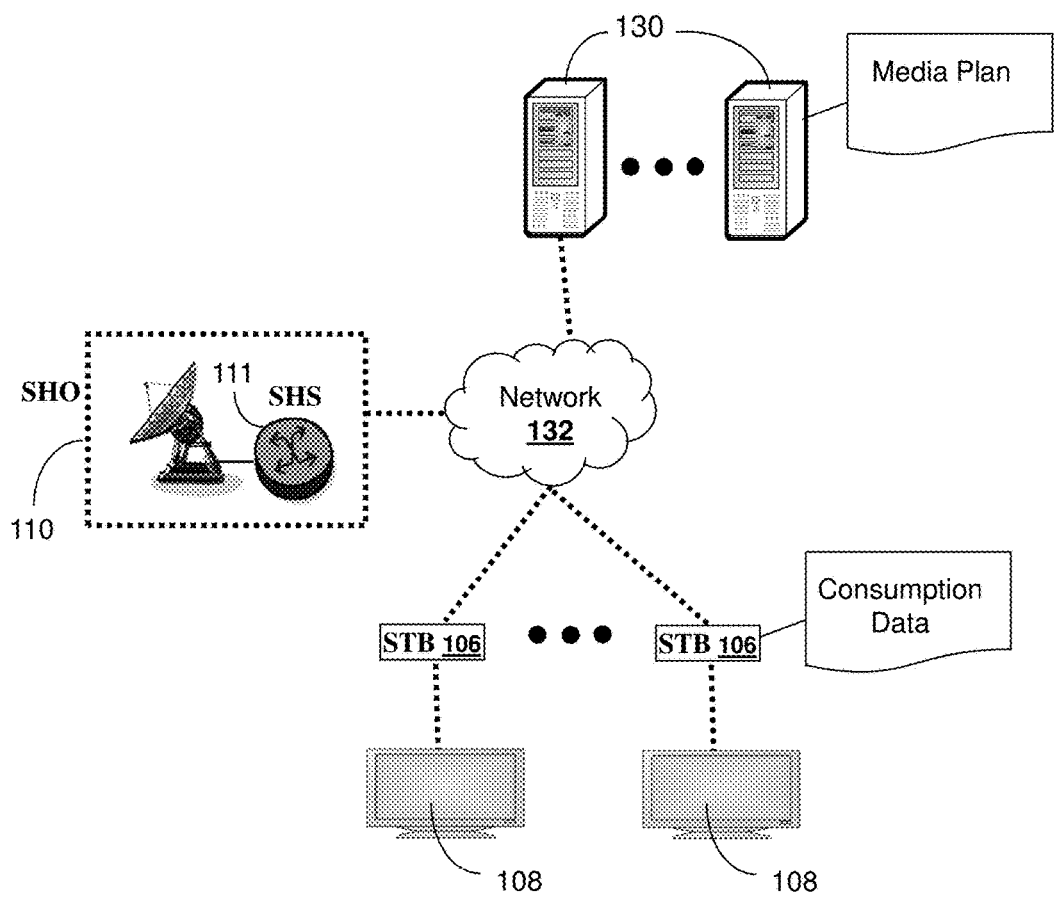
FIG. 1 depicts an illustrative embodiment of a communication system that provides media services and targeted advertising.

The subject disclosure describes, among other things, illustrative embodiments of generating advertising media plans for broadcast content where the media plans are based on campaign criteria including cost-per-mille and/or reach. To generate the media plan(s), ridge regression analysis and/or a greedy heuristic can be applied to identified impressions representing viewing of selected content, where the identified impressions are detected from monitored consumption data collected by a group of media processors that present broadcast content. Other embodiments are included in the subject disclosure.

One embodiment of the subject disclosure includes a device having a memory and a processor. The memory can store computer instructions and the processor, which is coupled to the memory, can execute the computer instructions to perform operations including obtaining consumption data from a group of set top boxes, where the consumption data indicates channel tuning events at one or more set top boxes of the group of set top boxes including changing of channels presenting broadcast content. The processor can detect identified impressions from the consumption data, where the identified impressions represent display of selected content. The processor can determine campaign criteria associated with an advertising campaign and can, responsive to the campaign criteria including a cost-per-impression criteria, apply a regression analysis to the identified impressions to determine a predicted number of target impressions per advertisement slot. The processor can generate a first media plan based on a ratio of an advertisement slot cost to the predicted number of target impressions per advertisement slot.

One embodiment of the subject disclosure is a method including obtaining, by a system including a processor, consumption data from a group of media processors, where the consumption data indicates channel tuning events at one or more of the group of media processors including changing of channels. The method can include detecting, by the system, identified impressions from the consumption data, where the identified impressions represent display of selected content. The method can include determining, by the system, campaign criteria associated with an advertising campaign. The method can include, responsive to the campaign criteria including a reach criteria, determining, by the system, predicted user-based slot impressions based on the identified impressions. The method can include generating, by the system, a first media plan based on an advertisement slot cost and the predicted user-based slot impressions, where the generating of the first media plan includes applying a greedy heuristic to the identified impressions.

One embodiment of the subject disclosure includes a tangible computer-readable storage medium that includes computer instructions which, responsive to being executed by a processor, cause the processor to perform operations including determining identified impressions that are detected from consumption data collected from a group of media processors, where the identified impressions represent display of selected content, and where the consumption data indicates channel tuning events at the group of media processors including changing of channels. The instructions can include applying a regression analysis to the identified impressions to determine a predicted number of target impressions per advertisement slot. The instructions can include generating a media plan based on a ratio of an advertisement slot cost to the predicted number of target impressions per advertisement slot.

FIG. 1 depicts an illustrative embodiment of a communication system 100 for delivering media services. The communication system 100 can represent an Internet Protocol Television (IPTV) media system or another interactive system that allows for bi-directional communication between service provider equipment and customer premises equipment, including delivering media content services and engaging in monitoring of end-user devices, such as collecting user-interaction data from the set top boxes 106.

For example, the IPTV media system can include a super head-end office (SHO) 110 with at least one super headend office server (SHS) 111 which receives media content from satellite and/or terrestrial communication systems. In the present context, media content can represent, for example, audio content, moving image content such as 2D or 3D videos, video games, virtual reality content, still image content, and combinations thereof. The SHS server 111 can forward packets associated with the media content over a network 132 for receipt by one or more media processors 106, such as set top boxes. The set top boxes 106 can present the media content via media devices 108, such as televisions.

The media processors 106 and media devices 108 can utilize tethered communication technologies (such as coaxial, powerline or phone line wiring) and/or can operate over a wireless access protocol such as Wireless Fidelity (WiFi), Bluetooth, ZigBee, or other present or next generation local or personal area wireless network technologies. By way of these interfaces, unicast communications can also be invoked between the media processors 106 and subsystems of the IPTV media system for services such as video-on-demand (VoD), browsing an electronic programming guide (EPG), or other infrastructure services.

Some of the network elements of the IPTV media system, such as set top boxes 106, can be coupled to one or more computing devices 130 (hereinafter called server) over the network 132. Server 130 can obtain consumption data from a group of set top boxes 106. The consumption data can include various information, such as channel tuning events occurring at the group of set top boxes 106. These events can include changing of channels that are presenting broadcast content, changing of volume, trick play (e.g., pause, fast forward, rewind), and so forth. The particular set top boxes from which the consumption data is retrieved or otherwise obtained can be selected based on a number of factors, including geographic location, subscriber data (e.g., demographics including age and/or gender), user profiles, and so forth. The server 130 can analyze the consumption data to detect identified impressions that are representative of a user viewing content, as opposed to surfing through the channels or performing some other non-viewing event.

The server 130 can determine campaign criteria associated with an advertising campaign such as a cost-per-mille criteria and/or a reach criteria. These criteria can be established by the service provider and/or can be a requirement of a potential advertiser. In one embodiment, responsive to the campaign criteria including a cost-per-mille criteria, the server 130 can apply a ridge regression analysis to the identified impressions to determine a predicted number of target impressions per advertisement slot. The server 130 can then generate a first media plan based on a ratio of an advertisement slot cost to the predicted number of target impressions per advertisement slot. In another embodiment, responsive to the campaign criteria including a reach criteria, the server 130 can determine predicted user-based slot impressions based on the identified impressions. The server 130 can then generate a first media plan based on an advertisement slot cost and the predicted user-based slot impressions, where the generating of the first media plan includes applying a greedy heuristic to the identified impressions.

The generated media plan(s) can be used for providing advertising to end user devices which can include the group of set top boxes 106 from which the consumption data was retrieved.

In one embodiment, the identified impressions can be detected from the consumption data by determining whether a set top box 106 of the group of set top boxes was tuned to a channel for more than a minimum threshold time period and less than a maximum threshold time period. In one embodiment, the ridge regression analysis comprises a weighted ridge regression analysis using weighting factors applied to the identified impressions detected from the consumption data, where the weighting factors are determined based on a regularization parameter and an identity matrix. In one embodiment, the media plan can be generated for a plurality of time periods, where the plurality of time periods utilize different prediction models that include the applying of the ridge regression analysis to the identified impressions.

In one embodiment, each of the different prediction models can utilize a common matrix based on the identified impressions detected from the consumption data. In one embodiment, the consumption data can include timestamp data for each of the channel tuning events. In one embodiment, the consumption data can be collected locally by each of the group of set top boxes 106 and can be periodically provided to the server and/or provided to the server in response to a request or other query provided by the server or another network element. In one embodiment, the media plan can be generated based on one of a ridge regression analysis or a greedy heuristic and then adjusted to generate an adjusted media plan based on the other of the ridge regression analysis or greedy heuristic.

One or more of the exemplary embodiments can eliminate or reduce otherwise wasted budget, by more precise targeting in television media campaigns. One or more of the exemplary embodiments can also automate the campaign creation process. Automatically creating television campaigns can have very high impact as it will enable more campaigns to be run faster. Furthermore, quick campaign turn-around can enable quicker tuning/modifications to subsequent campaigns based on near immediate feedback.

One or more of the exemplary embodiments can identify the task of television media campaign generation for a target audience; provide efficient algorithms to solve these tasks while recognizing their properties and limitations; and validate the efficiency gained by operating in the proposed framework. This can be achieved by comparing the proposed techniques against the ones used to generate a traditional campaign.

As an example of the types of gain in efficiency that can be achieved by one or more of the exemplary embodiments, a 44% improvement over traditional campaign design for a particular ad campaign example in terms of a key operational metric, CPM (Cost-per-Mille: which measures the value per thousand impressions) and an up to 18% gain in reach (which measures the number of unique customers who view the ad) was achieved.

The key influence in advertising can be television ratings information. Ratings information, such as audience size and its composition (demographic characteristics, such as, age, gender etc.) can be the main source of quantitative data used in media campaign creation. This data can be used in conjunction with various business rules and more qualitative information to design media plans. Some examples of such qualitative information are the perception of alignment between the advertiser and the proposed network/channel/ program, or any restrictions on times of day to show the ad. The manual and iterative nature of traditional campaign design process can be improved by more efficient techniques for campaign creation. The algorithms of the exemplary embodiments are able to target users much more efficiently. In other words, the exemplary embodiments achieve better performance than traditional campaigns, at a lower cost.

Media plans describe how media campaigns are ultimately specified in order to be placed. An excerpt from an exemplary media plan is given in Table I.

TABLE 1

EXCEPT FROM A FICTITIOUS MEDIA PLAN.
Campaign Dates: May 14, 2012-Jun. 10, 2012

| Channel | Day | Date | Daypart | Unit Count |
|---------|-----|------|---------|------------|
| A&E | Mon | May 14, 2012 | LateNite | 3 |
| A&E | Tue | May 15, 2012 | Fringe | 2 |
| A&E | Tue | May 15, 2012 | Primetime | 1 |
| A&E | Wed | May 16, 2012 | LateNite | 3 |

As Table I shows, each line in the plan specifies the channel, date, and day-part where a (typically) 30-second ad will be placed. It also specifies the number of ads to be inserted in the chosen period (Unit Count), which is the number of 30-second ad slots. This is why this count is also referred to as the number of insertions, which is also how it will be referred to herein. For the purpose of brevity, a {day-part, channel} combination will be referred to as a Slot. There are a few constraints for campaign generation that can be identified and considered. The first constraint is the campaign budget, which is simply the total dollar amount available to spend on the ad-insertions in the plan. A Slot typically has a going rate for each desired 30-second ad insertion. This Slot rate is affected by many factors, such as, time of the day (for any channel, ad insertion in a LateNight Slot is often cheaper than in the Primetime Slot), the popularity of the channel (popular channels which on an average have a large audience are typically more expensive to insert on as compared to channels with small audience) etc. The budget of the campaign can determine how many total ad spots can be purchased. A second constraint is that media campaigns are usually specified to run for 4 or 6 weeks. It is possible to concentrate ad insertions on some particular weeks, say, for example, by ramping up insertions before a product launch. Alternatively, some advertisers may desire spreading the plans out uniformly over the entire 4 to 6 week period. In one or more exemplary embodiments, a weekly basis operation can be utilized, but other embodiments can account for these changes, using a weekly budget that allocated taking these campaign preferences into account. Third, the inventory constraints, and not budget constraints, may dictate the maximum number of ad insertions on Slots. Many cable providers are allocated a small number of advertising insertions on particular channels in particular Slots as part of their service contract. For instance, this could be 4, thirty second insertions per hour.

The length of the Slot (size of its day-part) can constrain the total number of possible ad insertions for that Slot. For example, the Fringe daypart, which spans 3-7 PM every weekday is 4 hours long. Assuming inventory of 4 insertions per hour, this implies that the maximum number of insertions possible in such a Slot is 16 (4×4). In reality however, an advertiser may not desire to place a maximal number of ads in any single Slot. Not only is such a large amount of inventory typically not available (the market place for television advertising is very robust and inventory is almost never unsold), maxing out a Slot would lead to some very undesirable characteristics for a campaign—it may be annoying for a user to watch the same ad twice or thrice in a row. For these reasons the maximum allowable number of ad insertions per Slot can be set to some small value. For the one or more exemplary embodiments, values in the range of 2-6 are described, although other values can be utilized. The fourth constraint has to do with the fact that only certain channels may be available to place ads on. These channels are also called "Insertable" channels. This may be due to various reasons like the policy of the channel itself-certain premium cable channels are not ad supported, or as part of cable provider contracts. Finally, creating a media plan customized for a set of target audience requires at least one more specification, namely, the metric to evaluate on. Two metrics which are very popular in the television industry are: CPM (Cost-per-Mille) which reflects the cost associated per thousand estimated views for an ad. All other things being equal, lower CPM is better (you want more impressions on your target customers at a lower cost); and Reach which counts the number of unique target users who are exposed to an ad. Again, all other things being equal, higher reach is better (a larger number of your target customers see your ad).

One or more exemplary embodiments can observe and analyze historical television interaction data from a target audience. This data can be used to train forecasting/predictive models for the viewership of the target audience. The viewership predictions in turn can feed optimization or improvement algorithms which enable creating campaigns targeted to optimize or improve various metrics that are important for the specific advertisers.

The data associated with the television viewership of target audience can be obtained from various sources, such as a major national cable provider. For instance, it can be STB interaction data. This STB interaction data can be anonymized, and any personal information identifying the users can be removed. The interaction data can include, among other things, which channel the STB is tuned to, and at what time of day. This may not be explicitly labeled data, in the sense that users do not confirm whether they were watching the television when the STB was tuned to a particular channel. Hence, there is some amount of inference that needs to be done to determine to a reasonable degree whether to credit a user for having watched a particular channel at a particular point in time.

Once an inference has been drawn as to which user watches what channel and at what time, predictive models can be generated for their expected viewership into the future. The definition of the future is given by the time period in which the advertiser wants to place its ad. As described before, these typically correspond to 4-6 weeks ahead. This step can be an estimation of the ratings information, but more precisely tuned to the target audience. The predictive models for the target audience can then be used to drive the optimization algorithms. One or more of the exemplary embodiments can optimize or improve the two most popular metrics used in the television industry. First, media plans can be generated by optimizing or improving the CPM. These media plans can essentially maximize or increase the number of times an ad is shown to the target audience while minimizing the cost. Second, media plans can be obtained by optimizing or improving the Reach metric. These media plans can maximize or increase the number of unique target users who will be exposed to the ad.

Furthermore, two types of reach optimized campaigns can be utilized: binary reach and fractional reach.

The raw data being utilized can include the interaction of anonymous users with their STBs. This stream of user-STB interaction data, can include time-stamped channel tune events, such as, channel tunes/changes, change in volume etc. The STB viewership information is intended to be retrieved from this raw data stream. In other words, from this interaction data, an inference can be drawn as to which channels do the target audience watch and at what times. Viewership determination and predictive modeling can be based on STB Impression counts (a term common in online advertising). Impressions, in turn, are based on counts of viewership, and in one embodiment can be based on filtered STB channel tune events. These select tune events meet certain activity and inactivity thresholds, which are rules based on the time that transpires between channel tunes/changes that users execute using their STB remote control. In particular, two filters can be used to identify a valid channel tune event. The first filter, called the Activity Filter, removes any viewership that is too small to actually indicate engagement. In one embodiment, viewership may not be credited to any STB tuned to a channel for less than 20 seconds in length (although other time periods may also be utilized). The second filter, called the Inactivity Filter, stops giving credit to channel tunes that have a large time interval from the last known remote event (channel change or tune). This filter can account for people who routinely fail to turn off their STBs when done watching—some just turn off their televisions, and some televisions are just always left on. The Inactivity Filter can stop giving credit to channel tunes after a selected time period (e.g. 1.5 hrs) of no activity using the remote. In other words, a slot can be counted as being viewed by an STB only if there is at least some STB activity (events using the remote control) in the preceding 1.5 hrs.

After filtering the raw target STB data to obtain valid channel tune data, all continuous time can be divided into contiguous 15-minute blocks (other time block divisions are equally valid). The aggregate channel tune information for any STB (including non-contiguous viewership) on any channel in a block is what was use to define impressions. A Subslot can be defined as a particular combination of {15-minute block, channel}. The Subslot viewership amounts, i.e., the number of seconds tuned in, out of the 15 minutes in that Subslot, can be converted to impressions via thresholding. In particular, a single impression can be counted if a particular STB watches more than 5 minutes (non-contiguous, aggregate) of a particular 15 minute Subslot. Note that alternative definitions of impressions are equally valid, and impressions do not have to be restricted to discrete numbers. For example, a single impression could be the amount of time a Subslot is viewed by all STBs, divided by the length of the Subslot. Once STB impression data id obtained, it can be aggregated in two different ways to facilitate the two different predictive models generated. A common dimension of aggregation is time. In the exemplary campaigns, the ability to buy spots for ad placement may exist only at what is called the daypart granularity. This is mainly due to the fact that traditional campaigns have typically operated at this level of granularity. Dayparts are a coarse partition of the week by time. Table II provides the definitions of the dayparts.

TABLE II

DAYPART DEFINITION

| Daypart | Time | Period |
|---|---|---|
| Daytime | M-F | 6a-3p |
| Fringe | M-F | 3p-7p |
| Late Night | M-Su | 12a-6a |
| Prime | M-Su | 7p-12a |
| Weekend | Sa-Su | 6a-7p |

The first aggregated dataset used for forecasting is the Slot level impressions dataset. As a reminder, a Slot is defined as a {daypart, channel} combination, and thus aggregates over the many Subslots contained in that Slot. In the Slot level dataset, weekly files hold the Slot impression values aggregated over the users. This dataset can be used in generating CPM-optimized media planning. Our second dataset used for forecasting, is the user level impressions dataset. It is a weekly dataset holding the user/STB slot aggregated impression values. This dataset is used to build Reach-optimized media plans. A few other points worth mentioning about the data: First, usage data is only pulled on insertable channels. As mentioned previously, these are the channels where a cable provider will have available inventory and the ability to place ads. The raw user viewership is "normalized" to local times. This aligns 10 AM regardless of the time zone in which the ad is to be shown. This makes sense for two reasons: 1. The cable television provider can only insert ads locally. 2. One may want to devise national campaigns.

CPM is defined as cost per thousand impressions. At the level of a campaign, given an advertising budget, CPM is the ratio of the campaign cost (in dollars) to the number of impressions (in thousands) that the campaign achieves. Similarly, one can also define the CPM at the level of a Slot. CPM of a Slot is the cost of a single ad insertion in that Slot, divided by the number of impressions the ad achieves in that Slot. The algorithm for creating a CPM optimized media plan for the target group can be seen as a two-step process: Step 1—Using the past viewership history of the target audience, learn a model to forecast the number of target impressions in all the insertable Slots in the time period for which the media campaign is sought. Step 2—Select Slots for the media campaign which optimize the campaign CPM using these predicted Slot target impressions estimates. Once an accurate estimation of the number of impressions for all the insertable Slots is attained, creating a media plan that optimizes the CPM (Step 2 above) involves sequentially picking slots that provide the best value for impressions. Indeed the following CPM algorithm can be optimal:

```
Input: predicted Slot impressions v(s)
Slot cost c(s)
budget B
max. insertions parameter m
Output: A media plan MP_cpm
Initialize MP_cpm = [ ]{empty media plan}
Sort the Slots in ascending order of their Slot-CPMs
c(s)/v(s).
while B≥0 {Budget not exhausted} do
Pick the next Slot s in the sorted list
Add m insertions of s to the media plan MPcpm
Set B = B − mc(s) {update the Budget}
end while
```

The only unknown in the above algorithm is the predicted number of target impressions per Slot. The performance of the CPM optimized model can hinge on the accuracy of these predictions.

Media campaigns typically run for 4-6 weeks, and the media plan for each week can be handled independently. A further independence assumption can be made for the Slot impression prediction task as well. In particular, for each week, an independent model can be trained to forecast the number of impressions for Slots in that week. In other words, the number of prediction models trained can be equal to the number of weeks for which the media campaign is sought. As an example, for a 4 week campaign, four different predictive models can be created. The first model takes as input the historical viewership data of target audience (training data), and predicts Slot impressions 1-week ahead from the last date of the training data (for the first week of the plan). Similarly, the second model predicts the impressions 2-weeks ahead from the last date of the training data (for the second week of the plan), and so on till week 4. Matching intuition, it gets harder and harder (and then levels off) the further out one is trying to predict. Thus one would expect that a 1-week ahead model will do better predictively than the 4-week ahead model.

One or more of the exemplary embodiments can utilize the regression based predictive model for the target Slot impressions prediction task used above. Ridge regression can be used to predict the Slot target impressions. Essentially, modeling of the number of target impressions in each Slot as a linear combination of the number of target impressions in the same Slot in the previous k weeks can be performed. k is a hyper-parameter, whose value is chosen via cross-validation. Recall, that each week is treated independently of the other weeks, and there are separate weekly prediction model, which predict the impressions of all Slots in that week. Let i be an index over the dayparts in a week. Then from Table II, i ranges from $i \in [1 \ldots 26]$. Let there be M "insertable" channels, and let j be an index over them: $j \in [1 \ldots M]$. Then any Slot $s_{i,j}$ corresponding to the daypart i, and channel j, in a week t is identified by $s_{ijt}$. Let $y_{sijt}$ denote the number of target impressions in the slot $s_{ijt}$. Mathematically, these number of impressions can be estimated as:

$$\hat{y}_{s_{ijt}} = \sum_{m=t-k}^{t-1} w_i y_{s_{ijm}} \quad (1)$$

where $w_i$'s are the parameters of the model needed to estimate. Let W denote the vector of parameters $[w_1, w_2, \ldots , w_k]$. In order to learn the weights W, a training dataset is created from the historical target impressions of the current Slot $s_{i,j}$, and Ridge regression is used to compute W. Ridge regression lets us add a shrinkage factor to the weights via a tunable parameter $\lambda$.

Figure 2:
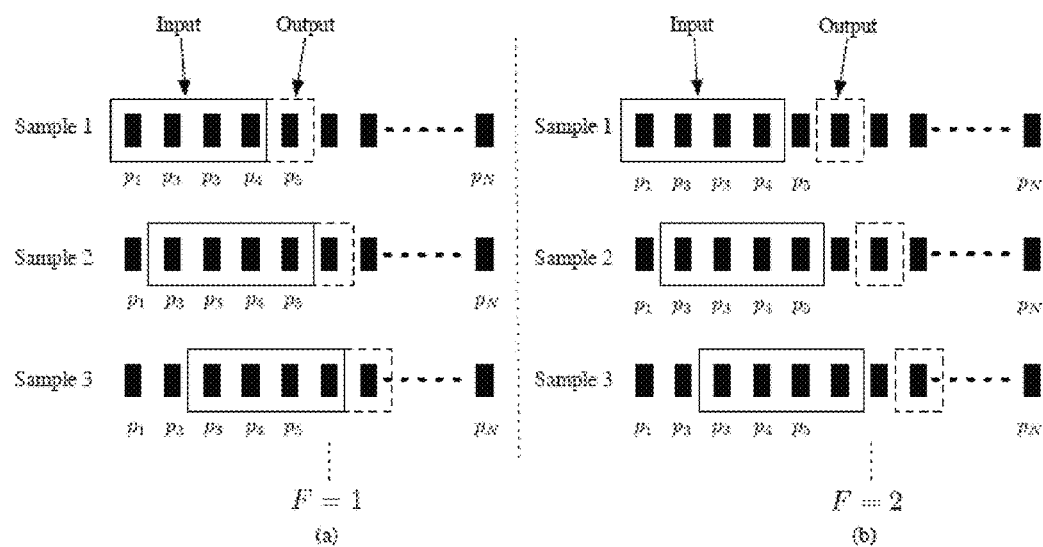
FIG. 2 depicts dataset training from historical target impressions.

FIG. 2 illustrates how the training dataset is generated for each Slot $s_{i,j}$, for k=4 for different values of F, namely F=1, and F=2. The total number of such samples (input:output pairs) generated will be equal to N−k−F. Assume for the current $Slot_{sij}$, the target impression counts are available for the past N weeks. For the sake of simplicity of notation let us denote these impressions by $p_1, \ldots p_N$. Thus $p_1 = y_{sij1}$, $p_2 = y_{sij2}$, and so on. Let us also assume looking back at the window of size k, and forecasting F(=1) one week ahead. Then for any response week t ($t \in [k+F, \ldots, N]$), one associates k input weeks indexed by t−F; t−F−1, ..., t−F−(k−1), and create a single training sample (an input-output pair) $(\{p_t-F, \ldots, p_t-F-(k-1)\}:p_t)$. The input of this training sample consists of the impressions from the past k weeks, which is paired with the impressions of the response week t. This process can be repeated for all values oft such that $t \in [k+F, \ldots, N]$. Let the number of such pairs generated be P. Then a P×k matrix X can be defined, such that its i-th row stores the impressions associated with the input weeks corresponding to the i-th training sample. A vector Y of size P can be defined, which stores the impressions of the corresponding response (output) weeks. Then the linear system to be solved in order to obtain the weights W is given by $$L = (Y - XW)^T (Y - XW) + \lambda W^T W. \quad (2)$$

There exists a closed form solution of the above system and is given by $$W = (X^T X + \lambda I)^{-1} X^T Y, \quad (3)$$

where I is an identity matrix of size k×k, and $\lambda$ is the regularization parameter whose value is computed using a validation process. Any linear algebra package will be able to handle the above system, and since these parameters are estimated per slot, the systems of equations themselves are very small. Once these parameters are estimated, equation 1 is used to predict the target impressions for any Slot $s_{i,j,t}$ in week t.

There are a number of advantages associated with this prediction model. First, it is simple. While it is more general than an auto-regressive model, it is less sophisticated than many other time series models which take into account other factors, such as, seasonality. This simplicity also leads to very fast training and testing of the model. Second, since the matrix X does not change across the various 1; 2; 3 and 4 week ahead predictions, the inverse in the above expression only needs to be evaluated once for all the 4 models. The only variable that changes is Y. Third, since each Slot per predictive week is handled independently of the other, the model is highly parallelizable.

The independence assumptions made for computational convenience may result in a few limitations of the model. Weeks are treated independently, as are the Slots. Consecutive dayparts on the same channel are also considered independent. Presumably, an approach that will make less drastic independence assumptions, and will allow to share data across the Slots and the weeks, may lead to more efficient predictions. Improved model predictions can lead to improvements in the generated media plans. In one or more embodiments. these independence assumptions can be relaxed and other predictive techniques applied.

While CPM as an objective aims to optimize the number of cost-effective impressions, it may not explicitly take into account what fraction of the target STBs the campaign will be shown to. For example, consider two Slots (Slot 1 and Slot 2) that have the same ad insertion cost. Suppose the program that airs on Slot 1 has a medium-sized fan base, but these fans are die-hard fans. It is viewed by 1000 target STBs, who always watch all of this program, translating to roughly 8 impressions per STB. This results in 1000*8=8K impressions for Slot 1. Slot 2 features a more popular program, but one where people constantly tune in and tune out. So, say 4000 target STBs each roughly have 2 impressions, also resulting in 8K target impressions for the Slot. In terms of CPM, Slot 1 and Slot 2 are identical, but in terms of number of unique STBs to whom the ad will be shown (our definition of reach), Slot 2 reaches far more STBs (4 times as many). It seems evident that there will be instances when clients would like the ability to optimize a media plan for target reach (and so would prefer Slot 2 in the example above). This might occur, for example, during the launch of a new product/service, when the client is interested in generating awareness about their new product/service.

Optimizing reach can entail a very different kind of optimization problem. If the problem were simplified by assuming knowledge of which Slots everyone would watch (thus removing the need for viewership predictions in this simplified scenario), picking the Slots that would maximize reach given a budget is an instance of a budgeted maximum coverage problem. Even with unit Slot costs, this is an NP-hard problem, by a reduction from the set cover problem. While integer programming provides one feasible path towards obtaining optimal or near optimal media plans, a greedy heuristic can also be utilized which provides a worst-case approximation factor of $(1-1/\sqrt{e})$, but in practice performs significantly better.

This algorithmic choice is made even more sensible given that there may be a desire to estimate Slot viewership per target user, which may be imperfect in itself.

In a first embodiment, a simpler binary data case (where the target user is assumed to either watch the complete Slot or not) for reach optimization can be utilized. In what follows, let U be the set of all users (STBs), S be the set of all Slots, and for $u \in U$, $s \in S$, let $v(u, s)$ denote the viewership data for user u of Slot s. In a more general case, the values $v(u, s)$ could be the number of seconds viewed of that particular Slot. In the restricted binary data setting, this viewership quantity can be subject to a threshold, with a tunable threshold scalar parameter $\lambda$ setting $v(u, s)$ to 0 or 1 depending on whether the corresponding viewership amount is greater or less than $\lambda$ (alternatively or in combination, the data can be created where instead of this hard thresh holding, a probabilistic setting can be applied instead). Now in this simple binary case, a non-zero $v(u, s)$ implies a high confidence in our prediction that a particular user has a high propensity to watch that particular channel in that day part. Correspondingly, if an ad is placed in this Slot, one would expect to reach that user (i.e., one expects the user to see an ad that was place in that Slot). Given a budget, picking the set of Slots that maximizes the reach (number of unique users who will see an ad) is exactly the NP-hard budgeted maximum coverage problem. One can choose to approximate the solution using a greedy heuristic, which provides a provable $(1-1/\sqrt{e})$ approximation ratio.

The greedy heuristic for binary reach is as follows:

```
Input: Binary v (u, s) user, Slot viewership data
    Slot cost c(s)
    budget B
    max. insertions parameter m
Output: media plan MP_reach
Initialize MP_reach = [ ] {Empty media plan}
Initialize r(u) = 1 for u ∈ U {r(u) = remaining reach}
while B ≥ 0 {Budget not exhausted} do
    Pick the Slot s that maximizes remaining reach divided
      by cost: Σ_u ∈ U r(u)v(u, s))/c(s)
    Add a single insertion of s to the media plan, MP_reach
    For all u ∈ U, if v(u, s) = 1, then set r(u) = 0
    Set B = B − c(s)
end while
```

At a high level, the greedy binary heuristic just sequentially picks Slots that maximize remaining reach per cost. So, the first Slot picked is the Slot that has the highest reach per cost. Once this Slot is chosen, all the users can be removed from the dataset that are assumed to be covered by an ad placed in this Slot. One can examine the remaining users data, and pick the next Slot that maximizes reach per cost on these users, and so on. Thus iterations consisting of picking Slots to maximize reach, and modifying the data assuming those users are reached. While the worst case bound on this algorithm is a factor of $(1-1/\sqrt{e})$, in practice on exemplary datasets the performance is extremely good and actually very close to a linear programming-based lower bound.

In the context of fractional reach, the main difference is that the data assumed to have knowledge of per user is the probability that they will watch a particular Slot (and not the hard thresholded binary version of this data above). For fractional reach, $v(u, s)$ will represent user Slot viewership probabilities (given any user viewership in a Slot, these probabilities sum to one over all the Slots in the same time interval). As a first step, one can estimate the effect of placing an ad in a particular Slot on reaching a particular user. Suppose user u watches a Slot with probability $v(u, s)$, and one places an ad in that Slot. Then the probability that they do not watch the ad is $1-v(u, s)$. Continuing in this vein, suppose one places multiple ads in Slots $s_1, s_2, \ldots s_n$. The probability that u has not watched any of these ads is $\Pi^n_{i=1} (1-v(u, s_i))$. This is because the event that u has not been reached is exactly the compound event that she is not reached by any ad individually. Thus, the probability that u is reached is $1-\Pi^n_{i=1} (1-v(u, s_i))$, which, summed over all users, is what one calls the "fractional reach". This lays the ground for the intuition behind the fractional reach optimization algorithm. Because of the non-linear product $\Pi^n_{i=1} (1-v(u, s_i))$, fractional reach is not easily modeled as an integer linear program, one again can use a greedy heuristic for fractional reach as follows:

```
Input: Fractional v(u, s) user, Slot view probabilities
    Slot cost c(s)
    budget B
    max. insertions parameter m
Output: media plan MP_fracReach
Initialize MP_fracReach = [ ] {Empty media plan}
Initialize r(u) = 1 for u ∈ U
    {r(u) = prob. that u has not yet watched an ad}
while B ≥ 0 {Budget not exhausted} do
    Pick the Slot s that has not yet been inserted m
      times, and that maximizes (Σ_u ∈ U r(u)v(u, s))/c(s)
    (remaining reach divided by cost)
    Add an insertion of s to the media plan, MP_fracReach
    For all u ∈ U, set r(u) = r(u)(1 − v(u, s))
    Set B = B − c(s)
end while
```

The core algorithm is quite similar to the binary case, with the exception that now after selecting any particular Slot s with fractional reach, the remaining reach r(u) for each user may be reduced, but doesn't become zero unless $v(u, s)=1$. As a further consequence, the same Slot now has the chance to be selected more than once, provided the gain in fractional reach per cost it provides is more than the fractional reach provided by any other Slot (per cost).

One embodiment of a predictive model for user level Slot impressions can predict Slot impressions for a user using a simple windowed average. Mathematically, $$\hat{y}_{s_{ij}t} = \frac{1}{k} \sum_{m=t-k}^{t-1} y_{s_{ij}m} \qquad (4)$$

This model can be selected for a number of reasons. First, people tend to be quite repetitive in their television watching, and this model forms an extremely simple, and yet also powerful baseline estimator. Second, there are potentially a very large number of target STBs whom will all need individual models (millions of STBs in the target is not at all uncommon). This places practical restrictions on the computational burden user level impressions modeling can impose. Finally, the main focus of our work is on the optimization formulation of media campaign generation and user or aggregate Slot impressions prediction. Any model for individual STBs that makes better predictions will only strengthen our campaign performance results.

EXAMPLE CASE STUDIES

Two advertising campaigns performed in 2012 were considered. In both of these cases, traditional campaigns were created around target audience specifications in the customary manner. This involved matching the channels to the demographic attributes of the target audience as described above. The advertising clients included a car manufacturer and an investment/retirement planning firm. In the rest of the example description, these clients along with their campaigns will be referred to as CAR and BANK respectively. The target audience for both campaigns is similar, in that both the clients are interested in higher income customers of an overlapping, but slightly different age demographic. The number of target STB sets for both the clients were in the hundreds of thousands. In addition, the CAR client specified the target to be males. Consequently, the number of target STBs for it were a little smaller. Furthermore, the objectives for both campaigns were different. The BANK was seeking a campaign to maximize CPM over the target audience, while the CAR was seeking a campaign which maximized Reach instead. Both campaigns were 4 weeks long and the budgets for both the campaigns were similar, with the BANK having a slightly higher budget. Both the clients desired an even campaign, and accordingly one can allocate the total budget equally to all four weeks.

Since these were traditional television campaigns an opportunity existed to create a variety of optimization based campaigns, and evaluate against them. Our experimental methodology for both case studies is similar to back-testing in investment analysis and proceeds as follows. The historical viewership data of the target STBs can be used to generate two types of data described above, namely, Slot-based data, and User-based data. Note that in this example only viewership data from prior to the start of the campaign was utilized. Training of the prediction models can be performed and various campaigns can be generated corresponding to different values of the hyperparameters. In particular, two hyper-parameters were explored: 1. the maximum number of insertions allowed in each Slot, and 2. the two objective functions, namely, CPM and Reach. The campaigns were then deployed in parallel to the traditional campaign. After the campaign period is over, the ground truth target STB data was collected. This data is also converted to impressions data, against which was evaluated via the performance of all campaigns, as well as the traditional campaign.

Figure 3:
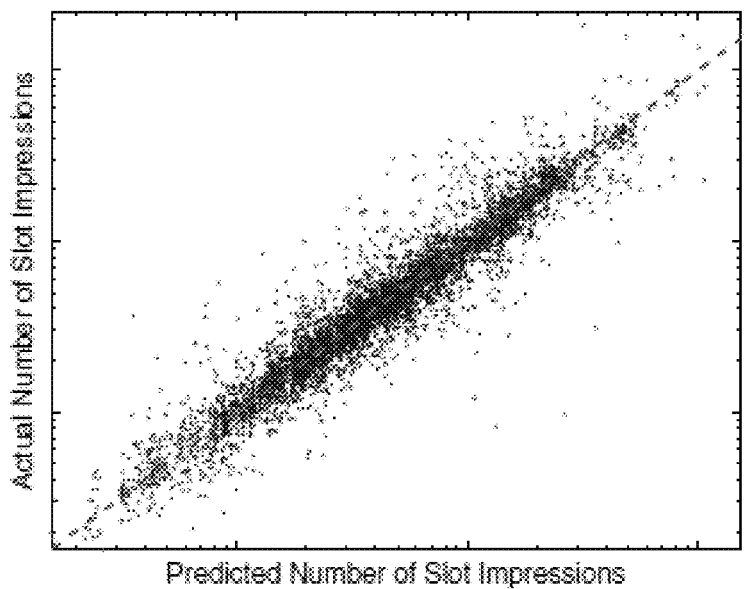
FIG. 3 graphically represents slot predictions vs. ground truth number of impressions for an example of the targeted advertising of the system of FIG. 1.

The predictive models were first evaluated, as these form the basis for CPM and reach optimization procedures. As can be seen in FIG. 3, our per Slot predictions are very good and show no obvious biases. There are a few Slots for which our impressions predictions are very different than the ground truth number of impressions. Upon examination however, one found that these Slots mostly corresponded to isolated and unpredictable events in television programming, such as, the broadcast of a popular college game in a Slot where there is usually sports news. FIG. 3 illustrates Slot predictions vs. ground truth number of impressions for the campaign length. The plot is on a log-log scale, and the y=x line is shown (ideal predictions would all lie on this line). Axis label values have been removed from the plot to protect sensitive information.

Our user level predictive results while acceptable, are not quite as good. There is more unexplained variance/error in the predictions. This is to be expected, as aggregation of Slot impressions from all target users, week to week, is bound to smooth out some noise and thus be much less variable. next proceed to the results of the media campaigns themselves. Table III shows the results for the CAR case study, and the corresponding table for the BANK case study is Table IV.

TABLE III

CAR RESULTS. PLEASE SEE THE TEXT FOR A DESCRIPTION OF THE QUANTITIES IN THE COLUMNS.

| ALG | INS | CPM | NEU | NI | AE | EA |
|---|---|---|---|---|---|---|
| TRAD | 2 | 10.00 | 100000 | 2856 | 14.35 | 2.16 |
| CPM* | 2 | 7.98 | 103729 | 2431 | 16.43 | 2.48 |
| CPM* | 4 | 5.60 | 95176 | 3969 | 25.82 | 3.88 |
| CPM* | 6 | 4.44 | 89309 | 5328 | 35.16 | 5.28 |
| CPM | 2 | 9.28 | 100867 | 2607 | 15.41 | 2.30 |
| CPM | 4 | 6.53 | 89679 | 4277 | 25.22 | 3.76 |
| CPM | 6 | 5.09 | 84304 | 5889 | 34.78 | 5.18 |
| FRAC | 2 | 9.66 | 105504 | 2604 | 8.05 | 1.20 |
| FRAC | 4 | 6.85 | 97970 | 4078 | 6.86 | 1.02 |
| FRAC | 6 | 5.46 | 96737 | 5380 | 6.63 | 0.99 |
| FRAC* | 2 | 8.34 | 111767 | 2425 | 9.42 | 1.42 |
| FRAC* | 4 | 6.15 | 110092 | 3701 | 8.78 | 1.32 |
| FRAC* | 6 | 5.03 | 109516 | 4913 | 8.57 | 1.29 |
| REACH | 2, 4, 6 | 15.23 | 115652 | 1708 | 10.09 | 1.49 |
| REACH* | 2, 4, 6 | 12.89 | 118114 | 1702 | 10.80 | 1.61 |

TABLE IV

BANK RESULTS. PLEASE SEE THE TEXT FOR A DESCRIPTION OF THE QUANTITIES IN THE COLUMNS.

| ALG | INS | CPM | NEU | NI | AE | EA |
|---|---|---|---|---|---|---|
| TRAD | 2 | 10.00 | 100000 | 2983 | 14.61 | 2.22 |
| CPM* | 2 | 8.13 | 105325 | 2595 | 16.16 | 2.46 |
| CPM* | 4 | 5.70 | 96341 | 4156 | 25.89 | 3.93 |
| CPM* | 6 | 4.52 | 91111 | 5506 | 35.02 | 5.31 |
| CPM | 2 | 9.42 | 101778 | 2799 | 15.29 | 2.32 |
| CPM | 4 | 6.61 | 90792 | 4339 | 24.99 | 3.77 |
| CPM | 6 | 5.13 | 85054 | 5977 | 35.66 | 5.36 |
| FRAC | 2 | 9.82 | 107286 | 2704 | 8.15 | 1.23 |
| FRAC | 4 | 7.00 | 100058 | 4128 | 6.87 | 1.04 |
| FRAC | 6 | 5.59 | 98877 | 5431 | 6.62 | 1.00 |
| FRAC* | 2 | 8.49 | 113793 | 2506 | 9.34 | 1.42 |
| FRAC* | 4 | 6.30 | 112237 | 3783 | 8.87 | 1.35 |
| FRAC* | 6 | 5.16 | 111693 | 5004 | 8.67 | 1.32 |
| REACH | 2, 4, 6 | 15.23 | 117874 | 1721 | 10.12 | 1.52 |
| REACH* | 2, 4, 6 | 12.95 | 120222 | 1720 | 10.81 | 1.63 |

In addition to our predictive model based results, using CPM, Binary Reach, and Fractional Reach as the objective functions, results are also shown for the traditional campaign (with a maximum of 2 insertions per Slot), and three other retrospectively optimal campaigns. These campaigns are marked with a "*" symbol beside their names.

These "*" campaigns (namely CPM*, FRAC*, REACH*), are computed after the campaign dates have elapsed, and are essentially derived from the same optimizations proposed. The only difference is that the target impression data used in these campaigns is not based on forecasting. Instead, the ground truth data was used to infer the number of impressions and probability for watching a Slot. For instance, CPM* is the optimal campaign for the time period in terms of CPM. These campaigns provide a nice set of bounds for our methods—it may be difficult to do as well as these campaigns, since predictive estimates are additionally being used, but they do give some indication for performance with respect to the best possible campaign.

The following are the descriptions of the abbreviations in the two tables:

ALG—The algorithm used to create the media plans.
CPM refers to the CPM optimized algorithm described above.
REACH refers to greedy binary reach algorithm described above
FRAC is the greedy fractional reach algorithm described above, and the traditional campaign is referred to by TRAD. There are also starred versions of CPM, FRAC and REACH algorithms, as described before.
INS—This is another hyper-parameter explored while generating the campaigns and it refers to the maximum number of ad insertions allowed per Slot. Experimented values were 2, 4, and 6.
CPM—For all the campaigns the test/ground truth cost per thousand impressions was reported.
NEU—This is a proxy for reach, and is defined as the number of exposed users. This is the number of unique target users who watched a Slot where an ad was placed. CPM and NEU for the traditional campaigns were scaled to 10 and 100,000 respectively. This results in a CPM scaling factor and an NEU scaling factor. All other CPM and NEU numbers are scaled with their corresponding scaling factor.
NI—Defined as Number of Insertions, it refers to the number of ad insertions a media campaign specifies in the four week
AE—The Average Exposures (AE) is defined as the average over target users of the number of advertised/chosen Slots the user watched.
EA—The Expected number of Ads seen, is simply the average over users of the expected number of ads seen by any user. This expectation was obtained assuming a binomial model with the average test/ground truth probability of watching a Slot for that user and taking the number of exposures as the number of trials.

The results validate our motivating claim that there is indeed substantial room to improve traditional campaign creation strategies. Our algorithms deliver superior performance on both CPM and reach. For instance, gains can be made in CPM up to 44% (for 6 insertions) if one considers aggressive inventory schemes. More practically, gains from 6-30% are very easily achieved by simply switching to CPM-based optimization for campaign creation. The difference in CPM between our proposal and CPM* is roughly 15%. Looking at NEU, using the binary reach algorithm one can cover around 18% more target STBs. Assuming target groups in the hundreds of thousands, this translates to being able to expose an additional tens of thousands of target customers to the advertisement. Surprisingly to us, the fractional reach optimization formulation results in much smaller increased reach and more closely resembles results from CPM optimization, rather than the binary reach optimization. There appears to be a distinct trade-off between minimizing CPM (low cost impressions) and exposing more unique customers (Reach). In the optimization steps, you are forced to choose between inserting maximally on Slots which have high Slot-CPM 'piling up', vs. trying to cover all the target users, and thus choose a diverse set of 'thinly spread' out Slots. Each could be advantageous depending on the specific campaign priorities.

Figure 4:
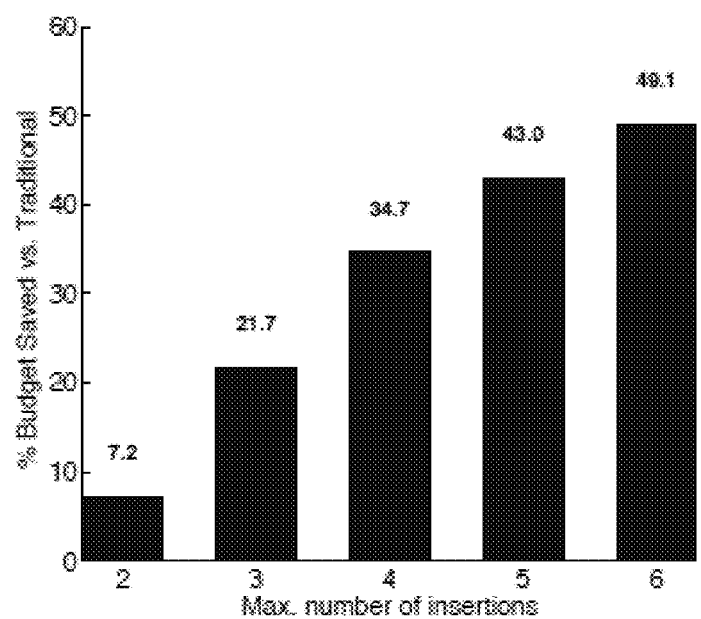
FIG. 4 graphically represents budget percentage savings for an example of the targeted advertising of the system of FIG. 1.

FIG. 4 illustrates the percentage of budget dollars saved by different CPM optimized media plans against the traditional campaign, for the same number of target impressions. Clearly, the CPM optimized campaigns have a significant monetary benefit over the traditional campaigns. As seen in the slot prediction results described above, and in the gap between CPM* and CPM, there is an opportunity for improved predictions that would result in even better media plans. This is particularly true in the case of reach based optimization (both binary and fractional), where the user Slot prediction model has (by nature) fairly high variance. An alternative strategy, however, would be to explicitly model this uncertainty, and account for it in a principled manner via portfolio optimization. First, one would approximately characterize the distribution of the count of Slot impressions, say for example, by the first two moments, i.e., by an expected value and variance. Given these slot impression mean and variance estimates, the idea behind the application of portfolio optimization would be to explicitly pick a limit on the amount of uncertainty tolerable in a media plan. An optimal plan can then be solved for with this additional limit on uncertainty set as a constraint. The intuition is that optimizing CPM assuming slot predictions having equal/no uncertainty, is risky. There might be cases where a less optimized but more stable solution is utilized— one that chooses to not favor slots that have highly variable week to week viewership, for instance. In another embodiment, can include principled methods to actively trade-off CPM for Reach and vice versa. Essentially CPM and Reach are objectives that may be at odds with each other. CPM favors 'piling up' on low cost high impression Slots, whereas Reach (binary) favors 'spreading thin' to cover the users. If you imagine placing points for media plans on the plane spanned by CPM on one axis and Reach on the other, the two points achieved by applying the binary reach algorithm and the CPM algorithm lie in opposite corners. An interesting idea of immense practical value would be to develop techniques that would allow one to systematically explore the 'efficient frontier' of solutions between these points. In other words, find the set of dominant solutions between the points. This would allow practitioners to systematically and near optimally trade-off reach for CPM or vice-versa and design campaigns that precisely meet their expectations.

One or more of the exemplary embodiments provide components and techniques to advertise for broadcast media content, such as received by a television, although other devices, including mobile devices, can receive the advertising and content. One or more of the exemplary embodiments can generate a media campaign as a combination of prediction and optimization problems. Models can be trained to generate media plans which are CPM optimal or Reach optimal. The superiority of the process can be validated by comparing the performance of media plans generated by the models against the ones generated by the traditional methodology, such as was done in the case studies described herein.

Figure 5:
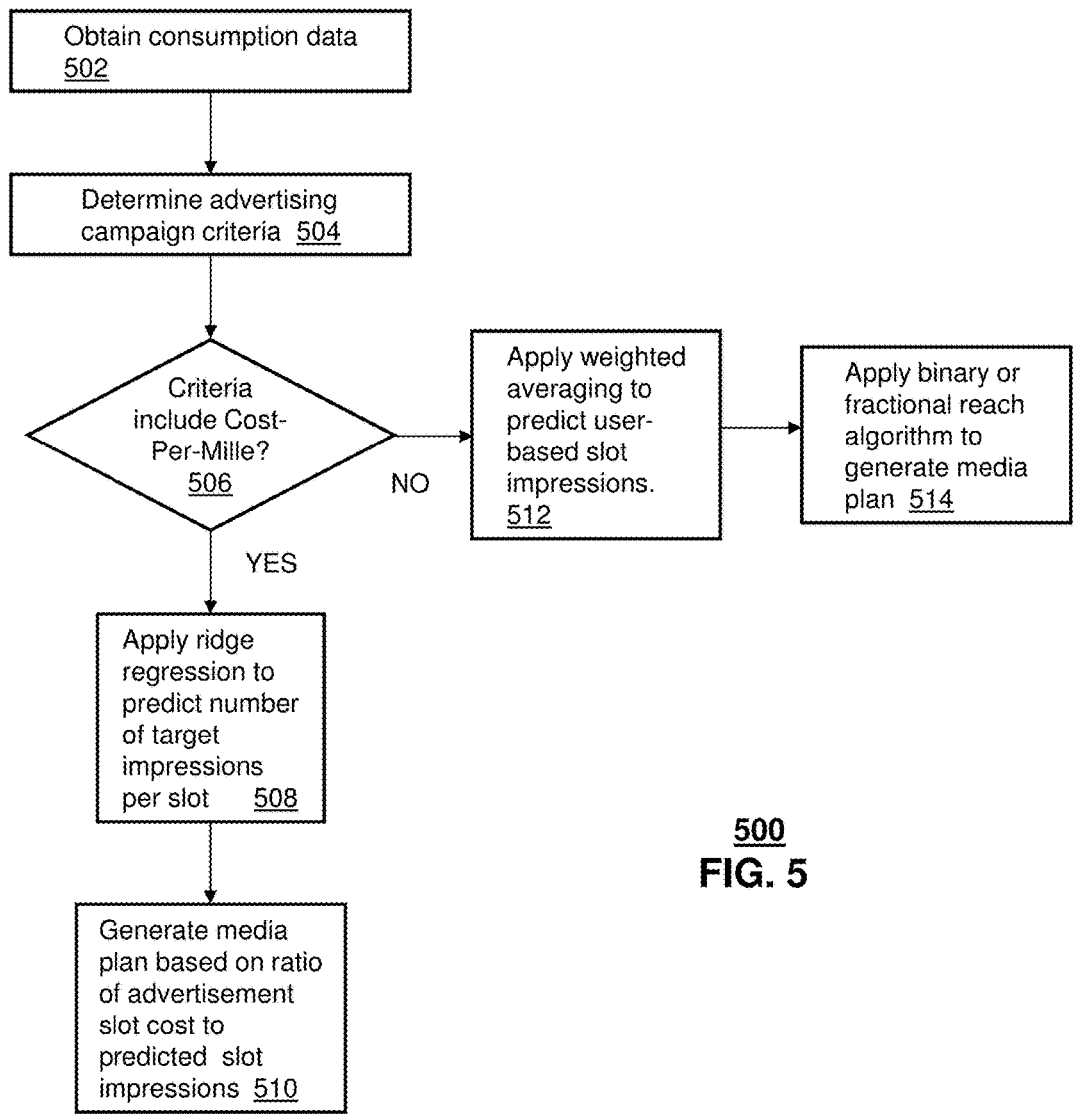
FIG. 5 depicts an illustrative embodiment of a method operating in portions of the system described in FIG. 1.

FIG. 5 depicts an illustrative method 500 that operates in portions of the devices of FIGS. 1-5. Method 500 can begin at 502 in which consumption data, such as channel changing, is collected and provided to the server 130. The consumption data can be associated with time information, such as a timestamp, and can be collected locally by each of the set top boxes 106. At 504, advertising campaign criteria can be determined, such as cost-per-mille and/or reach criteria.

At 506, if the campaign criteria includes the cost-per-mille criteria then method 500 proceeds to 508 to apply ridge regression analysis to the consumption data, such as to the identified impressions detected from the consumption data. This analysis can be used to determine a predicted number of target impressions per slot. At 510, a media plan can be generated based on a ratio of advertisement slot cost to the predicted number of target impressions per slot.

At 506, if the campaign criteria does not include the cost-per-mille criteria then method 500 proceeds to 512 to apply weighted averaging to predict user-based slot impressions. At 514, a media plan can be generated based on the advertisement slot cost and a predicted user-based slot impressions. For example, a reach analysis, such as a binary reach or fractional reach analysis can be applied. In one embodiment, the media plan is generated based in part on application of a greedy heuristic to the impression data. In one embodiment, multiple media plans can be generated based on steps 508-510 and 512-514, respectively. In another embodiment, these steps can be combined so that a single media plan is adjusted using both the ridge regression analysis and the greedy heuristic.

Figure 6:
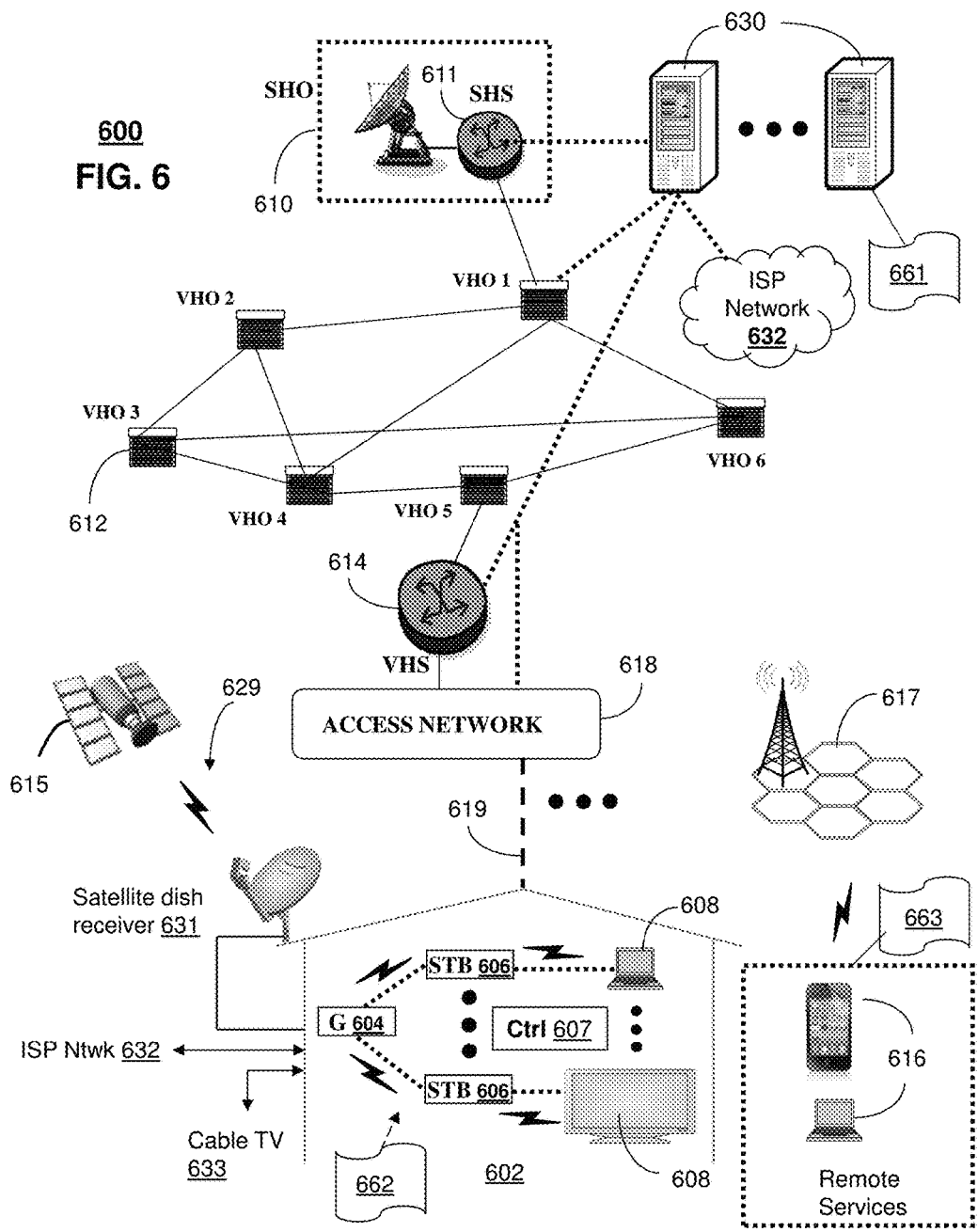
FIG. 6 depicts another illustrative embodiment of a communication system that provides media services and targeted advertising.

FIG. 6 depicts an illustrative embodiment of a first communication system 600 for delivering media content. System 600 can be an interactive television system that enables delivery of broadcast content, monitoring of consumption at end-user devices, and generating advertising media plans based on the consumption data. For example, the media plans can be generated for broadcast content where the media plans are based on campaign criteria including cost-per-mille and/or reach. Ridge regression analysis and/or a greedy heuristic can be applied to identified impressions representing viewing of selected content, where the identified impressions are detected from the monitored consumption data collected by a group of media processors that present broadcast content.

The communication system 600 can represent an Internet Protocol Television (IPTV) media system. The IPTV media system can include a super head-end office (SHO) 610 with at least one super headend office server (SHS) 611 which receives media content from satellite and/or terrestrial communication systems. In the present context, media content can represent, for example, audio content, moving image content such as 2D or 3D videos, video games, virtual reality content, still image content, and combinations thereof. The SHS server 611 can forward packets associated with the media content to one or more video head-end servers (VHS) 614 via a network of video head-end offices (VHO) 612 according to a multicast communication protocol.

The VHS 614 can distribute multimedia broadcast content via an access network 618 to commercial and/or residential buildings 602 housing a gateway 604 (such as a residential or commercial gateway). The access network 618 can represent a group of digital subscriber line access multiplexers (DSLAMs) located in a central office or a service area interface that provide broadband services over fiber optical links or copper twisted pairs 619 to buildings 602. The gateway 604 can use communication technology to distribute broadcast signals to media processors 606 such as Set-Top Boxes (STBs) which in turn present broadcast channels to media devices 608 such as computers or television sets managed in some instances by a media controller 607 (such as an infrared or RF remote controller).

The gateway 604, the media processors 606, and media devices 608 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 606 and subsystems of the IPTV media system for services such as video-on-demand (VoD), browsing an electronic programming guide (EPG), or other infrastructure services.

A satellite broadcast television system 629 can be used in the media system of FIG. 6. The satellite broadcast television system can be overlaid, operably coupled with, or replace the IPTV system as another representative embodiment of communication system 600. In this embodiment, signals transmitted by a satellite 615 that include media content can be received by a satellite dish receiver 631 coupled to the building 602. Modulated signals received by the satellite dish receiver 631 can be transferred to the media processors 606 for demodulating, decoding, encoding, and/or distributing broadcast channels to the media devices 608. The media processors 606 can be equipped with a broadband port to an Internet Service Provider (ISP) network 632 to enable interactive services such as VoD and EPG as described above.

In yet another embodiment, an analog or digital cable broadcast distribution system such as cable TV system 633 can be overlaid, operably coupled with, or replace the IPTV system and/or the satellite TV system as another representative embodiment of communication system 600. In this embodiment, the cable TV system 633 can also provide Internet, telephony, and interactive media services.

The subject disclosure can apply to other present or next generation over-the-air and/or landline media content services system.

Some of the network elements of the IPTV media system can be coupled to one or more computing devices 630, a portion of which can operate as a web server for providing web portal services over the ISP network 632 to wireline media devices 608 or wireless communication devices 616.

Communication system 600 can also provide for all or a portion of the computing devices 630 to function as a media plan generator (herein referred to as server 630). The server 630 can use computing and communication technology to perform function 661, which can include among other things, obtaining consumption data, analyzing the consumption data to detect identified impressions that are representative of a user viewing content, determining campaign criteria associated with an advertising campaign such as a cost-per-mille criteria and/or a reach criteria, applying a ridge regression analysis to the identified impressions to determine a predicted number of target impressions per advertisement slot, and/or determining predicted user-based slot impressions based on the identified impressions. The server 630 can generate one or more media plans. The media plan(s) can be based on an advertisement slot cost and the predicted user-based slot impressions, where the generating of the first media plan includes applying a greedy heuristic to the identified impressions. The media plan can be based on a ratio of an advertisement slot cost to the predicted number of target impressions per advertisement slot. The generated media plan(s) can be used for providing advertising to end user devices which can include the group of media processors 606 from which the consumption data was retrieved.

The media processors 606 and wireless communication devices 616 can be provisioned with software functions 662 and 663, respectively, to utilize the services of server 630. Software functions 662 and 663 can include collecting consumption data and transmitting the data to the server 630, such as periodically and/or in response to a request for the data. Criteria for collecting the consumption data, such as definitions of a channel tuning event and so forth, can be provided to the media processors 606 from the server 130 or another service provider network element.

Multiple forms of media services can be offered to media devices over landline technologies such as those described above. Additionally, media services can be offered to media devices by way of a wireless access base station 617 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Upon reviewing the aforementioned embodiments, it would be evident to an artisan with ordinary skill in the art that said embodiments can be modified, reduced, or enhanced without departing from the scope of the claims described below. For example, the raw data collected can also include data associated with mobile devices. For instance, mobile device broadcast content consumption can be monitored in addition to consumption at set top boxes. In one or more embodiments, models can be trained to generate media plans which are based on CPM and Reach, but which are a compromise between desired values for these two criteria without being an optimization of either criteria. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 7:
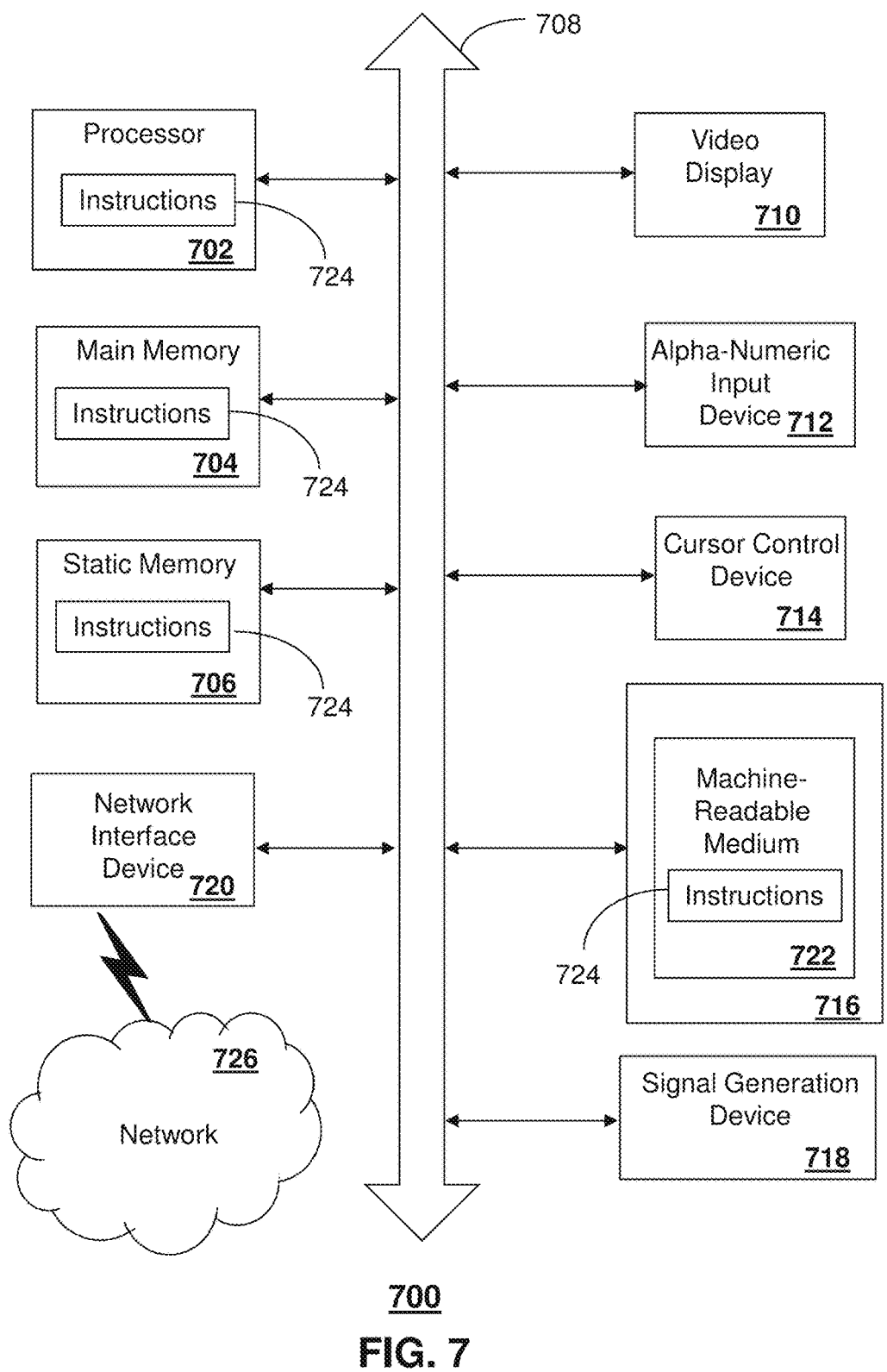
FIG. 7 is a diagrammatic representation of a machine in the form of a computer system within which a set of instructions, when executed, may cause the machine to perform any one or more of the methods described herein.

FIG. 7 depicts an exemplary diagrammatic representation of a machine in the form of a computer system 700 within which a set of instructions, when executed, may cause the machine to perform any one or more of the methods describe above. In some embodiments, the machine may be connected (e.g., using a network 726) to other machines. In a networked deployment, the machine may operate in the capacity of a server or a client user machine in server-client user network environment, or as a peer machine in a peer-to-peer (or distributed) network environment. As an example, computer system 700 can include server 130, 630, media processors 106, 606 and/or devices 616.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor (or controller) 702 (e.g., a central processing unit (CPU), a graphics processing unit (GPU, or both), a main memory 704 and a static memory 706, which communicate with each other via a bus 708. The computer system 700 may further include a display unit 710 (e.g., a liquid crystal display (LCD), a flat panel, or a solid state display. The computer system 700 may include an input device 712 (e.g., a keyboard), a cursor control device 714 (e.g., a mouse), a disk drive unit 716, a signal generation device 718 (e.g., a speaker or remote control) and a network interface device 720. In distributed environments, the embodiments described in the subject disclosure can be adapted to utilize multiple display units 710 controlled by two or more computer systems 700. In this configuration, presentations described by the subject disclosure may in part be shown in a first of the display units 710, while the remaining portion is presented in a second of the display units 710.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 722 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 700.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
a processing system including a processor; and
a memory that stores instructions that, when executed by the processing system, facilitate performance of operations comprising:
obtaining consumption data associated with a group of media devices;
detecting identified impressions from the consumption data;
determining campaign criteria associated with an advertising campaign;
predicting a number of target impressions per advertisement slot by applying a regression analysis to the identified impressions using the campaign criteria as a predicted number of target impressions per advertisement slot;
generating a media plan based on a ratio of an advertisement slot cost to the predicted number of target impressions per advertisement slot; and
instructing equipment of an advertiser to place advertising content into broadcast content in accordance with the media plan.

2. The device of claim 1, wherein the campaign criteria includes a cost-per-impression criterion.

3. The device of claim 1, wherein the campaign criteria includes a reach criterion.

4. The device of claim 1, wherein the consumption data indicates channel tuning events at a media device of the group of media devices including changing of channels presenting the broadcast content.

5. The device of claim 4, wherein the identified impressions are detected from the consumption data by determining whether a media device of the group of media devices was tuned to a channel for more than a first threshold time period and less than a second threshold time period.

6. The device of claim 4, wherein the channel tuning events comprise changing of volume by a media device of the group of media devices.

7. The device of claim 4, wherein the channel tuning events comprise a pause operation, a fast-forward operation, or a rewind operation relating to the broadcast content.

8. The device of claim 1, wherein the consumption data is collected locally by each media device of the group of media devices and periodically obtained from the group of media devices, and wherein the processing system comprises a plurality of processors operating in a distributed processing environment.

9. The device of claim 1, wherein the identified impressions comprise impression data, and wherein the operations further comprise aggregating the impression data for the group of media devices over a selected time period.

10. The device of claim 1, wherein the campaign criteria are established by a service provider, an advertiser, or a combination thereof.

11. A non-transitory machine-readable storage medium comprising executable instructions that, when executed by a processing system including a processor, facilitate performance of operations comprising:
obtaining consumption data from a group of media devices;
detecting identified impressions from the consumption data;
determining campaign criteria associated with an advertising campaign, wherein the campaign criteria are established by a service provider, an advertiser, or a combination thereof;
predicting a number of target impressions per advertisement slot by applying a regression analysis to the identified impressions using the campaign criteria, wherein the campaign criteria include a cost-per-impression criterion or a reach criterion;

generating a media plan based on a ratio of an advertisement slot cost to the number of target impressions per advertisement slot; and instructing equipment of an advertiser to place advertising content into broadcast content in accordance with the media plan.

12. The non-transitory machine-readable storage medium of claim 11, wherein the regression analysis comprises a ridge regression analysis and the processing system comprises a plurality of processors operating in a distributed processing environment.

13. The non-transitory machine-readable storage medium of claim 11, wherein the regression analysis comprises a greedy heuristic.

14. The non-transitory machine-readable storage medium of claim 11, wherein the identified impressions are detected from the consumption data by determining whether a media device of the group of media devices was tuned to a channel for more than a first threshold time period and less than a second threshold time period.

15. The non-transitory machine-readable storage medium of claim 11, wherein the identified impressions are detected from the consumption data by determining channel tuning events comprising changing of volume, a pause operation, a fast-forward operation, or a rewind operation by a media device of the group of media devices.

16. A method comprising:

obtaining, by a processing system including a processor, consumption data from a group of media devices;

detecting, by the processing system, identified impressions from the consumption data;

determining, by the processing system, campaign criteria associated with an advertising campaign;

determining, by the processing system, a predicted number of target impressions per advertisement slot by applying a regression analysis to the identified impressions using the campaign criteria, wherein the campaign criteria include a cost-per-impression criterion or a reach criterion;

generating, by the processing system, a media plan based on a ratio of an advertisement slot cost to the predicted number of target impressions per advertisement slot; and providing, by the processing system, an instruction to equipment of an advertiser to place advertising content into broadcast content in accordance with the media plan.

17. The method of claim 16, wherein the identified impressions are detected from the consumption data by determining whether a media device of the group of media devices was tuned to a channel for more than a first threshold time period and less than a second threshold time period.

18. The method of claim 16, wherein the consumption data comprise data relating to media content provided by equipment of a service provider, and wherein the campaign criteria are established by a service provider, an advertiser, or a combination thereof.

19. The method of claim 18, further comprising inserting, by the processing system, advertisements into the media content according to the media plan.

20. The method of claim 16, wherein the identified impressions comprise impression data, and further comprising aggregating, by the processing system, the impression data for the group of media devices over a selected time period.

* * * * *